United States Patent [19]
Wilkuski

[11] 4,285,713
[45] Aug. 25, 1981

[54] METHOD AND APPARATUS FOR FEEDING BATCH MATERIAL

[75] Inventor: James E. Wilkuski, Evergreen, Colo.

[73] Assignee: Johns-Manville Corporation, Denver, Colo.

[21] Appl. No.: 112,017

[22] Filed: Jan. 14, 1980

[51] Int. Cl.$^3$ ............................................. C03B 3/00
[52] U.S. Cl. ......................................... 65/27; 65/335; 414/156; 414/165
[58] Field of Search .................... 65/335, 27; 414/156, 414/165

[56] References Cited

U.S. PATENT DOCUMENTS

| | | |
|---|---|---|
| 3,715,059 | 2/1973 | Hyer. |
| 3,964,892 | 6/1976 | Schumacher et al. |
| 3,980,460 | 9/1976 | Nelson et al. .............................. 65/29 |
| 4,142,880 | 3/1979 | Wenda et al. ...................... 65/335 X |

FOREIGN PATENT DOCUMENTS

2801117  7/1979 Fed. Rep. of Germany ............. 65/335

*Primary Examiner*—Arthur D. Kellogg
*Attorney, Agent, or Firm*—Robert M. Krone; Joseph J. Kelly

[57] ABSTRACT

The invention relates to batch feeders for furnaces. Heretofore batch feeders have been complex, expensive to construct, use and maintain and have not ensured a uniform deposition of particulate batch material onto the batch cover in the furnace. The present invention provides a method and apparatus for obtaining a uniform layer of batch material by moving a particulate-covering trough 62 over a desired area. Disposed within the trough 62 is a feed means 80 having a cavity at one end with an opening in alignment with a discharge opening in the trough. The sidewalls defining the cavity have a plurality of perforations 87 therein. The other end of the feed means is connected to a vibrator so that as the vibrator is vibrated the one end of the feed means moves back and forth through the particulate material in the trough 62. The particulate material is forced through the perforations 87 in the feed means 80 and falls, under the influence of gravity, towards the desired area. The size and distribution of the perforations 87, the selection of the open area and depth of the perforations 87 along with the vibration amplitude and frequency of the feed means 80, control the through put of batch material onto the melt area so that when the feed means 80 is motionless, no particulate is deposited within the desired area but when the feed means is actuated an even distribution is effectuated.

17 Claims, 6 Drawing Figures

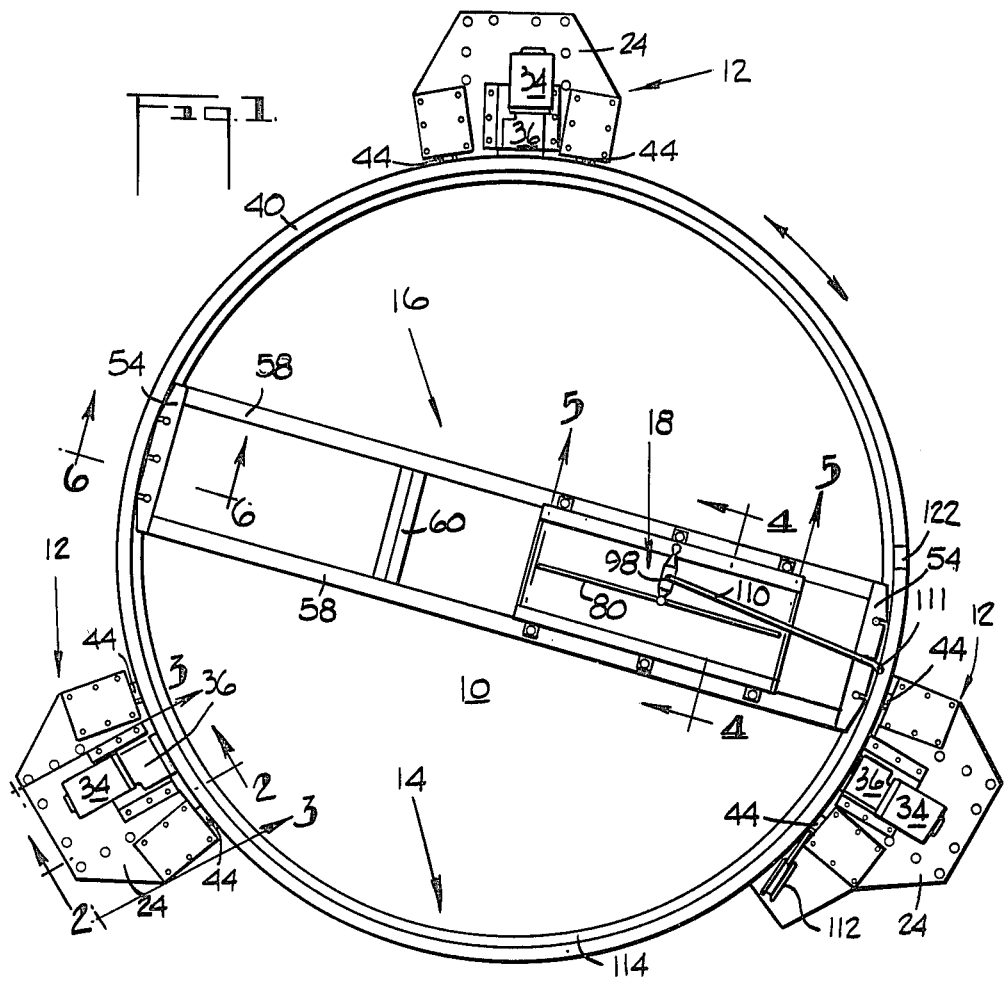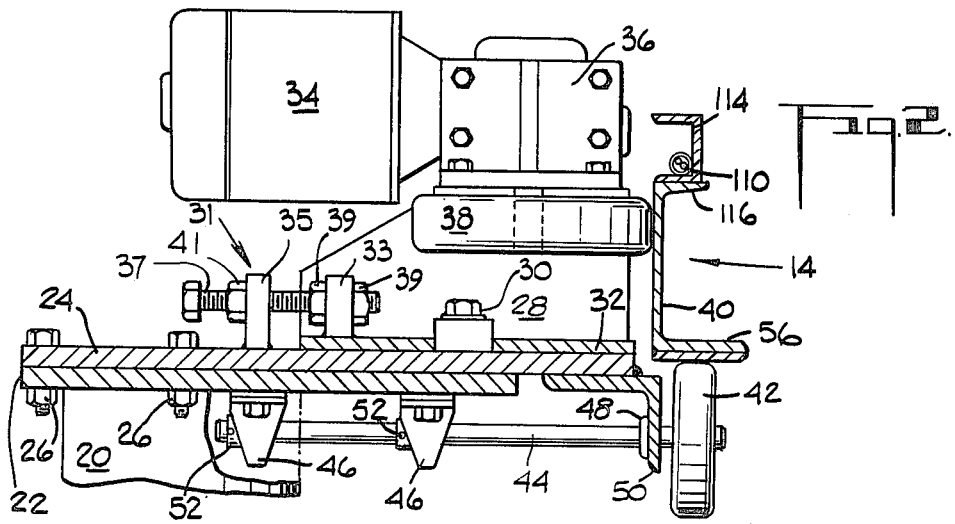

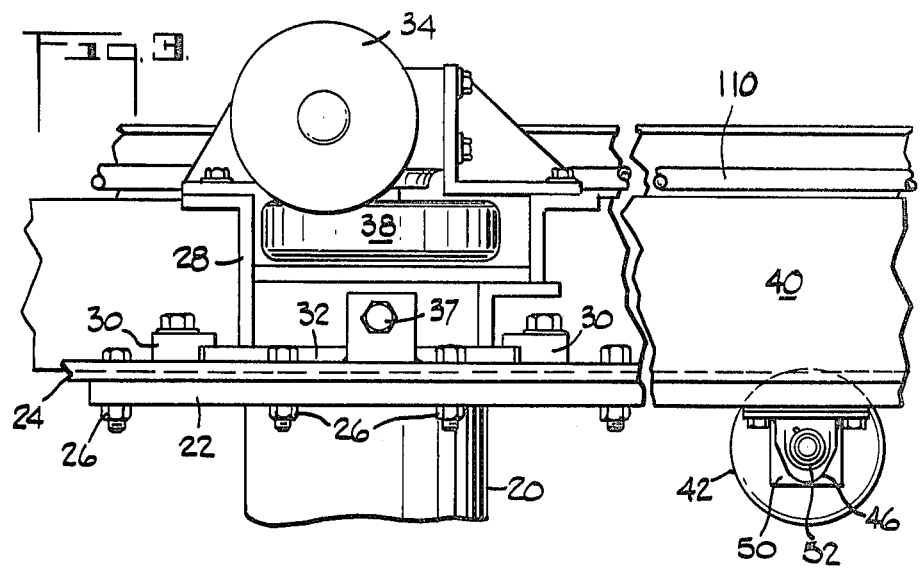
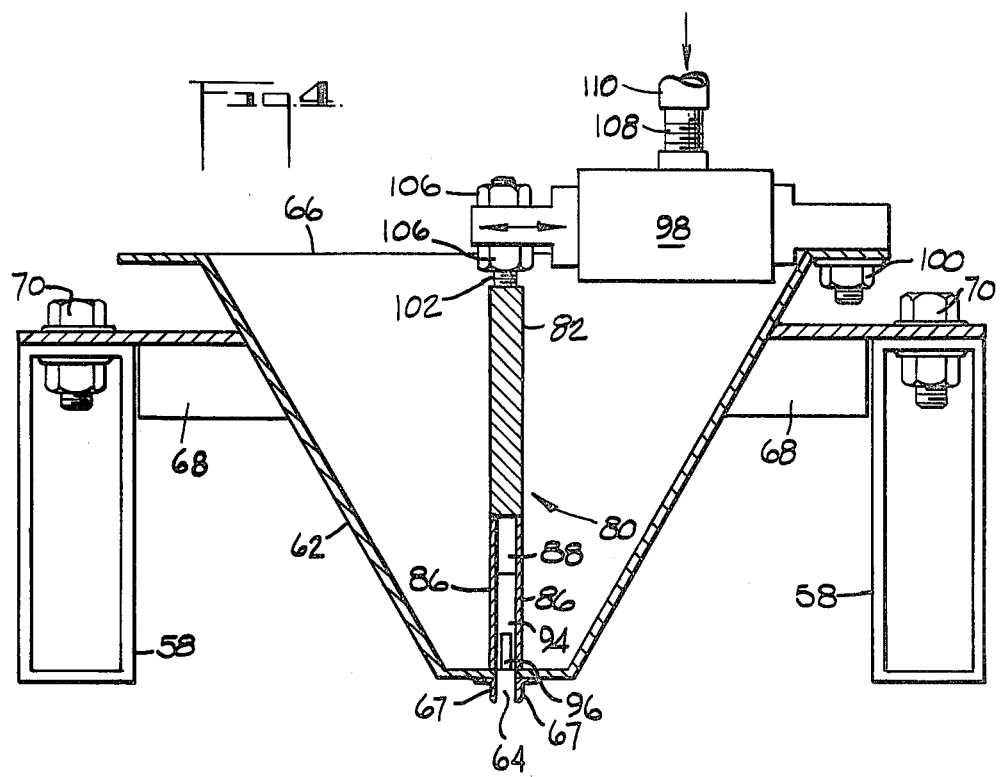

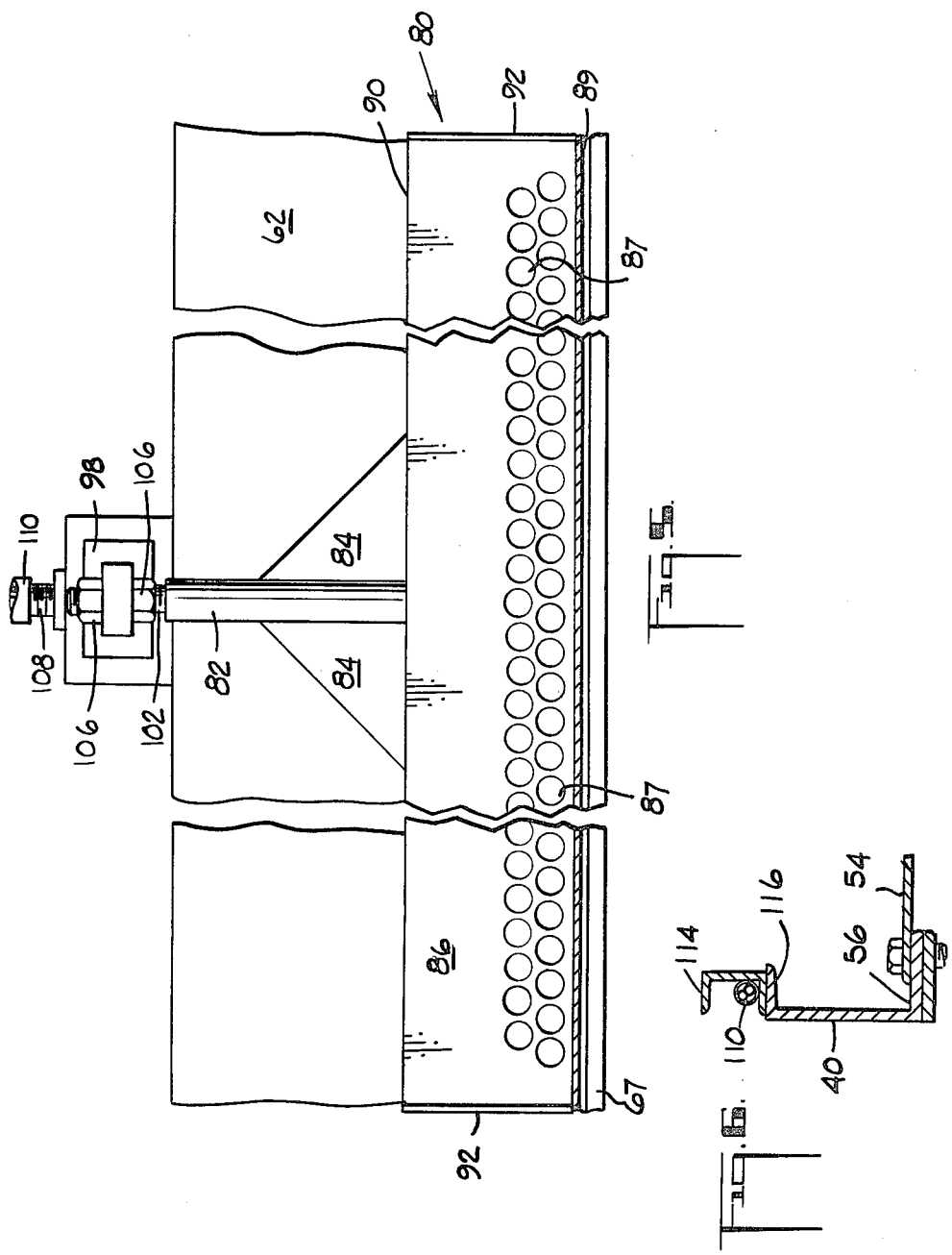

METHOD AND APPARATUS FOR FEEDING BATCH MATERIAL

TECHNICAL FIELD

The present invention relates broadly to the art of making molten materials and more particularly is concerned with an improved method of and apparatus for feeding batch materials into an electric melting furnace.

BACKGROUND OF PRIOR ART

In a conventional electrically operated melting furnace electrodes project into a furnace tank and are immersed in molten material disposed in the tank with batch material continually being supplied on top of the molten material to provide both a source of supply and an insulating layer or crust. Additional batch material may be supplied, as needed, by a feeder, typified by U.S. Pat. Nos. 3,980,460 and 4,142,880. These batch materials, when spread in a layer over the upper melt surface or melt line, serve as a partial insulating blanket to minimize heat loss to the surrounding environment. Problems arise when a uniform layer of batch material of a certain minimal thickness is not maintained over the whole upper surface of the melt line. Regions of the batch layer that are too thin "melt out", expose the molten material and create regions of excessive heat loss with a concomitant lowering of the temperatures of the molten material or melt and a lowering of the melt flow rate. In addition, regions of thinly covered melt may allow equipment located over the furnace, such as a batch feeder, to be exposed to excessive heat. When too thick a layer is deposited, the melt temperature may rise and uncontrollably increase the melt flow rate. Too much batch material also promotes formation of a surface crust which hinders the passage of the overlaying batch material to the melt line.

Inability to maintain a uniform thin layer of batch at an optimal thickness contributes to undesirable hot and cold thermal cycling of the melt with a resultant undesirable fluctuation of furnace performance. These ill effects are aggravated when the operating temperature of the furnace is increased. In refractory furnaces, which typically operate at 3400° to 4000° F., the need is greatest for a controlled deposit of batch material.

The batch feeders disclosed in the prior art do not insure that a thin, uniform layer of batch material is deposited over the melt. Another typical disadvantage is that the feeders require high maintenance. An ideal batch feeder would provide a controlled and uniform batch covering, generate little or no dust conditions in the working environment proximate to the furnace, be mechanically simple, inexpensive to construct, operate and maintain and would be highly reliable.

SUMMARY OF THE INVENTION

It is an object of the present invention to provide a batch feeder for an electric furnace.

An additional object is the provision of a batch feeder for an open top electric furnace capable of depositing batch material onto the entire melt surface of the furnace in a controlled uniform manner.

Another object of the present invention is the provision of a batch feeder that insures an optimal thickness.

A further object of the present invention is the provision of a batch feeder which is mechanically simple, inexpensive to build, operate, maintain and highly reliable.

Yet another object of the instant invention is the provision of a batch feeder which reduces dust conditions in the working environment proximate to the furnace.

A still further object of the present invention is the provision of a method of feeding batch material to an open top electrical furnace in a manner that effectively and efficiently reduces heat loss to the upper surface of the melt.

The present invention provides, in a circular open top electric furnace, a method for depositing particulate material over a desired area, comprising supporting a carriage above the area, supporting a hopper having a discharge opening on said carriage, filling the hopper with particulate material, moving the carriage over the area, moving a perforated chamber over the discharge opening and through the particulate material in the hopper thereby forcing the particulate material into the chamber and allowing the particulate material to fall onto the area.

The invention also includes an apparatus for depositing particulate material over a desired area, such as the upper surface of a molten mass carried in a circular open top furnace which comprises a trough-like hopper for holding particulate material. The hopper is carried by a carriage which is mounted for rotation in a horizontal plane such that the hopper traverses the circular area in the fashion of a radial arm about the center of the area, the bottom of the hopper having a single longitudinal discharge opening that extends generally radially from the center of the area to the outermost extent of the area. The apparatus also includes means for supporting the carriage and means for rotating and counterrotating the carriage. An agitator or a pneumatically operated perforated feed bar is located within the hopper in the vicinity of the longitudinal opening for engaging and stirring material within the hopper thereby facilitating the flow of material through the perforations in the feed bar. The agitator is connected to a pneumatic or electric reciprocator (or air vibrator) for driving the agitator whenever the carriage is in motion.

BRIEF DESCRIPTION OF DRAWINGS

FIG. 1 is a simplified plan view of the batch distributor or feeder assembly of the present invention.

FIG. 2 is a partial cross sectional view taken along lines 2—2 in FIG. 1.

FIG. 3 is a partial view, with parts broken away, taken along lines 3—3 of FIG. 1.

FIG. 4 is a partial cross sectional view taken along the lines 4—4 in FIG. 1.

FIG. 5 is a partial cross sectional view taken along lines 5—5 in FIG. 1.

FIG. 6 is a partial cross sectional view taken along lines 6—6 in FIG. 1.

DETAILED DESCRIPTION OF INVENTION

The batch distributor or feeder assembly 10 of the present invention may be disposed above an open-top, circular melting furnace (not shown) for melting particulate batch materials such as refractory or glass materials (cullet may also be present) and includes a furnace shell from which molten material may be discharged through an outlet member. Primary electrodes, not shown, are positioned radially about an outlet member and are used to melt particulate batch material by the heating effect of current flowing between the primary electrodes and the outlet member to form a pool of molten material. The configuration of both the furnace and electrodes may be of the general type illustrated in U.S. Pat. No. 3,983,309. A batch layer, established on the surface of the molten mass by the batch distributor 10, replenishes the pool of molten material in the furnace as molten material is discharged and also acts as an insulating blanket to insure efficient operation of the furnace.

The batch distributor 10 embodying the present invention is shown in FIG. 1 and comprises a plurality of drive pedestal subassemblies 12, a main upper drive ring subassembly 14, a distributor support 16 and a distributor 18.

The weight of the assembly 14, the support 16 and the distributor 18 is supported by means of the drive pedestal subassemblies 12. Since each of the subassemblies 12 are identical, the following description will be restricted to a single subassembly 12. Each subassembly 12 also provides a means for rotating and counter-rotating the main drive ring subassembly 14 about the center of the furnace or the area onto which the particulate material may be deposited. Each drive pedestal subassembly 12 comprises a support post or drive pedestal 20 upon which is fixed a mounting plate 22. A drive platform 24 is affixed by means of attachment bolts 26 to the plate 22. A support frame 28 is slidably mounted upon the platform 24 by means of a pair of adjustable support clamps 30 which cause a lower mounting plate 32 of the frame 28 to slidingly bear against the upper surface of the platform 24.

Supported by each frame 28 is a motor 34 which is connected via a gear box 36 to a pneumatic tire 38 which abuttingly contacts a main upper drive ring 40 of the main upper drive ring subassembly 14. The pneumatic tire 38 contacts the exterior surface of the ring 40 and is driven by the motor 34 such that the ring 40 may be driven either clockwise or counterclockwise. The force that the pneumatic tire 38 imposes upon the ring 40 may be controlled by an adjustment means 31.

Adjustment means 31 comprises a post 33 which is affixed to the lower mounting plate 32 of the frame 28 and a post 35 which is affixed to the upper surface of the platform 24. A threaded shaft 37 is rotatably mounted within the post 35 and within the post 33. A pair of collars 39 fix the end of the shaft 37 whereupon rotation of the shaft 37 the lower plate 32 of the frame 28 may be displaced relative to the post 35 with a concomitant adjustment of the force that the pneumatic tire 38 imposes upon the ring 40. A lock nut 41 fixedly positions the shaft 37 after the desired adjustment has been made.

The main upper drive ring 40 is suitably supported by means of a plurality of drive ring support wheels 42 which are fixed on shafts 44. Each of the two shafts 44 is rotatably supported on a platform 22 by means of a plurality of bearings such as pillow blocks 46 which are suitably attached to the undersurface of each plate 22. A bearing 48, fixed within a lower ring 50, that is suitably supported from the undersurface of a platform 24, also provides rotational support for the shafts 44. A plurality of collars 52 constrain the longitudinal or lateral movement of each shaft 44 while still permitting rotation of a shaft 44.

The main upper drive ring assembly 14 also comprises a pair of mounting ears 54 (see FIGS. 1 and 6) which are suitably supported from the lower flange 56 of the ring 40. The mounting ears 54 provide a means of supporting the components of the distributor support 16.

The distributor support 16 comprises a pair of cross members 58 which may be constructed of rectangular tubing. A spacer brace 60 insures that the cross members 58 maintain a parallel relationship. Suitably attached to one portion of the distributor support 16 is the particulate batch material receiving distributor 18 which comprises, as shown in FIGS. 1 and 4, a closed, generally V-shaped trough or hopper 62 which is provided with a longitudinal discharge opening 64 and an open top or material intake opening 66. The discharge opening has a lineal extent which is substantially equal to the radius of the furnace and is reinforced by means of angle irons 67, which insure that the discharge opening configuration is not deformed by high temperatures experienced proximate the furnace.

The trough 62 is supported upon the cross members 58 via a plurality of transverse angle iron support members 68 and bolts 70 which attach the outer portions of the support members 68 to upper surfaces of the cross members 58. The position of the trough 62 relative to the batch layer may be suitably adjusted by means of shims, not shown, which may be inserted between the flanges of the members 68 and the cross members 58.

Disposed within the trough 62, over the opening 64, is an agitator or a vibrating feed bar 80 which can be seen most clearly in FIGS. 4 and 5. The agitator 80 comprises a center post or a stem 82 and a pair of gussets 84 to which are suitably attached a pair of elongated parallel plates 86. The plates 86 are fixed apart in a parallel relationship by means of a spacer 88. A pair of end caps 92 together with the plates 86 define a material discharge chamber 94 in which is positioned a pair of vertical pins 96 that are fixed at opposite ends of the trough 62 proximate the discharge opening 64.

The batch material in the trough 62, acting on the outside of the plates 86, tends to restrict the lateral or side-to-side movement of the lower edges of the plates 86. Furthermore, in use, particulate batch material becomes lodged between the outer periphery of the pins 96 and the inner surface of each of the plates 86. Together with the pins 96, the particulate material acts like a hinge to constrain the lateral movement of the lower edges of the plates 86 so that the upper portion of the agitator may be moved by a vibrator (discussed below) and particulate material disposed within the trough 62 may be forced to pass through a plurality of holes or perforations 87 formed in each of the plates 86. In a preferred embodiment, seen in FIG. 5, the perforations 87 are disposed in a regular array comprising several rows of perforations. The perforations 87 do not extend to the lower edge 89 of the plates 86 in order to substantially seal the bottom of the discharge chamber 94. The hole pattern, hole size, number and depth is selected to take advantage of the phenomenon wherein particulate batch material will bridge thereby preventing particulate material from flowing into and through the perforations 87 when the agitator 80 is motionless.

A vibrator 98, which may be pneumatic or electric, capable of rapidly reciprocating in a single plane, is affixed to a flange 100 of the trough 62 and to a threaded end portion 102 of the stem 82 by means of a bolt 104 and nuts 106, respectively. In a preferred embodiment, the pneumatic air vibrator 98 is capable of reciprocating up to a maximum amplitude of approximately 1/16 of an inch at a frequency of approximately 3200 vibrations per minute. The frequency of vibration should be selected to avoid resonant frequencies of the structure of the feed bar. The vibrational frequency should not be so high as to be absorbed by the feed bar structure but should be high enough to cause the feed bar 80 to move through the particulate batch material. The optimum vibrational frequency for a particular application appears to be best determined through trial and error.

In use, the vibrator 98 moves one end of the feed bar 80 relative to another end, i.e., the end portion 102 relative to the lower edges of the plates 86. The vibrator 98 may be supplied with a motive fluid by means of a threaded fitting 108 which releasably attaches a reinforced flexible hose 110. The hose 110 is connected to a source of motive fluid (not shown), such as air by means of an elbow fitting 111 (see FIG. 1) fixed on the top flange 116 of the ring 40 and a hose payoff unit or a reel 112 which is fixed relative to the ring 40. As the ring 40 is rotated by means of the rotation of the pneumatic tire 38, the hose 110 is paid off the reel 112 and guided by means of an air hose guide or a channel 114 that is fixed atop the top flange 116.

The trough 62 is fed with a particulate batch material by means of a system (not shown herein but illustrated in U.S. Pat. No. 4,142,880). Shown in FIG. 2 of that patent is a batch dispersion box held in position above the batch distributor of that patent by a support arm. The batch dispersion box has four sides and a top with an open bottom being disposed such that the batch distributor may be rotated into a loading position where the open top of the distribution trough of the batch distributor is directly below the dispersion box and aligned with an opening in the box. A mechanically activated limit switch shown in FIG. 3 of that patent is affixed to a portion of a support frame which is below and radially in alignment with the dispersion box. A limit switch actuator depends upwardly from a right angle drive so as to engage the limit switch when the trough has been revolved to a loading position. A non-contact level sensor is preferably located along the length of the dispersion box and is responsive to the level of batch material within the trough. A hopper, holding a reservoir of batch material, is located above a metering unit to which it delivers batch material by way of a valve. The valve will automatically deliver a quantity of batch material to the holding chamber of the metering unit equal to an amount sufficient for filling the distribution trough. On a predetermined signal, a high pressure air blast, periodically delivered to the air-tight chamber of the metering unit, will propel its charge of batch material through a conduit as a plug of material in the manner known as dense phase conveying. The conduit connects with the interior of the dispersion box through a discharge pipe which directs material downwardly towards the trough. Any excess dust is returned by another conduit through a dust collector, which in turn redelivers the collected material to the metering unit.

After the trough 62 has been loaded with particulate material, as described above, and heat sensors (not shown) determine that batch material is required in order to maintain the prerequisite batch layer, the pneumatic tire 38 is rotated causing the main upper drive ring 40 to rotate in one direction. Simultaneously, the pneumatic vibrator 98 is actuated and causes the upper portion of the stem 82 to reciprocate back and forth through a relatively small displacement (e.g., less than 1/16 inch). The frequency and amplitude of movement of the vibrator 98 as well as the perforation size, perforation distribution and depth (the depth of the perforations is governed by the thickness of the plates 86) are the variables controlling the mass flow rate of the batch material through the chamber 94. Of course, the size of the particles of the batch material is an important factor used in determining the perforation parameters.

The batch material in the trough on the outside of the plates 86 tends to constrain the lateral movement of the lower edges of these plates 86. After an initial start-up period of operation, some particulate material becomes lodged in the clearance defined between the pins 96 and the inner surface of each of the plates 86. The pins 96, in combination with this particulate material, function as a hinge which tends to restrict the lateral movement (left to right, right to left movement as viewed in FIG. 4) of the lower edges of the plates 86. Because the lower portion of the discharge chamber 94 is constrained, the vibrating feed bar or agitator 80 is caused to be moved back and forth through the particulate material disposed in the trough 62 by the reciprocation of the vibrator 98 (note double arrows in FIG. 4). As the agitator 80 is forced to move back and forth through the material, the material is urged through the perforations 87 and directed into the material discharge chamber 94. The particulate material falls by means of gravity through the discharge opening 64 and onto the batch layer as a well-defined sheet of particulate batch material.

When the distributor support 16 has moved through an angle which is slightly greater than 360°, a limit switch 122 (see FIG. 1), fixed relative to the rotatable ring 40, stops the motion of the pneumatic tire causing the entire assembly to come to rest and deactivates the vibrator 98. Once put in motion, the batch feeder of the present invention will make one revolution of the furnace after which the trough 62 will be delayed at its loading position at the limit switch 122 for a number of seconds which time period allows for any necessary recharging of the trough 62 and a sensing of the batch layer thickness. The depositing action will be automatically resumed and the upper ring rotated in a direction opposite to the original direction when the heat sensors indicate the need for a continued distribution of batch material.

Using the apparatus of the preferred embodiment, a controlled layer of batch may be uniformly and reliably deposited over the melt of an electric furnace.

Various modifications of the above described embodiment of the invention will be apparent to those skilled in the art. For example, the apparatus could be translated in a linear fashion over a rectangular shaped furnace. Also, two diametrically opposed troughs could be provided with motion limited (in the case of a circular furnace) to 180° of rotation. In this last embodiment, the troughs could be filled from a single location allowing the system to rotate back and forth through the desired 180°. Alternatively, a single trough, extending diametrically across a circular furnace, could be utilized. It is understood that such modifications can be made without departing from the scope of the invention if they are within the spirit and tenor of the accompanying claims.

What is claimed and desired to be secured by Letters Patent of the United States is

1. Apparatus for depositing particulate material over a desired area, comprising:
 a carriage;
 means for supporting said carriage;
 means for moving said carriage above said area;

a hopper supported on said carriage, said hopper having an elongated discharge opening;

feed means disposed within said hopper;

said feed means having a cavity adjacent one end thereof;

said cavity having an opening in alignment with said elongated discharge opening;

said feed means having a plurality of perforations opening into said cavity from each side thereof;

means connected to the other end of said feed means for vibrating said feed means to cause particulate material to flow through said perforations into said cavity; and means for maintaining said opening of said cavity in alignment with said elongated discharge opening so that particulate material flowing into said cavity will flow out of said elongated discharge opening.

2. Apparatus according to claim 1, wherein said cavity is formed by a pair of perforated parallel plates and a pair of end caps.

3. Apparatus according to claim 2, wherein said perforations are formed as a plurality of spaced rows of orifices.

4. Apparatus according to claim 1, further comprising means for adjustably supporting said hopper on said carriage with respect to said area whereby the relative distance between said area and said hopper may be adjusted.

5. Apparatus according to claim 2, wherein said means for maintaining said opening of said cavity in alignment with said elongated discharge opening comprises pins, said pins being fixed on said hopper and extending within said cavity.

6. Apparatus according to claim 1, wherein said area comprises a circular furnace.

7. Apparatus according to claim 6, wherein said discharge opening extends for a radial extent substantially equal to the radial extent of said furnace.

8. Apparatus according to claim 2, wherein said vibrating means comprises a pneumatic vibrator, said feed means having a vertical stem attached to said plates, said vibrator being connected to said stem.

9. Apparatus according to claim 8, wherein said vibrator is supplied with a motive fluid, said fluid being conducted to said vibrator by a flexible supply hose, said hose being supplied by a retractable reel, said reel being fixed relative to said carriage.

10. Apparatus according to claim 6, wherein said carriage comprises a rotatable circular member, a pair of parallel support members fixed to said circular member, said hopper being fixed upon said support members.

11. Apparatus according to claim 10, wherein said carriage support means comprises a plurality of support pedestals, a plurality of rollers being rotatably affixed on each of said support pedestals, said circular member having an undersurface, said undersurface being supported by each of said rollers.

12. Apparatus according to claim 11, comprising a frame adjustably mounted on each of said pedestals, said moving means being mounted on said frame and being capable of rotating said carriage.

13. Apparatus according to claim 12, wherein said moving means comprises a motor mounted on said frame, a gear box connected to the output shaft of said motor, a pneumatic tire mounted on the output shaft of said gear box, said tire being mounted in abutting contact with said circular member.

14. Apparatus according to claim 13, wherein the axis of rotation of said tire is parallel to the axis of rotation of said circular member.

15. Apparatus according to claim 13, further including means for adjustably positioning said tire relative to said circular member.

16. A method for depositing particulate material over a desired area, comprising:

supporting a carriage above said area;

supporting a hopper having a discharge opening upon said carriage;

filling said hopper with particulate material;

moving said carriage over said area;

providing said hopper with a feed means having a cavity therein;

mounting said feed meanns so that an opening of said cavity is in alignment with said discharge opening;

vibrating said feed means to flow particulate material in said hopper into said cavity; and maintaining said opening of said cavity in alignment with said discharge opening during the vibration thereof so that said particulate material flows out of said cavity and through said discharge opening onto said area.

17. Method according to claim 16, comprising moving said carriage in a first direction over said area and then moving said carriage in a direction opposite to said first direction.

* * * * *